US009853591B2

(12) United States Patent
Saha et al.

(10) Patent No.: US 9,853,591 B2
(45) Date of Patent: Dec. 26, 2017

(54) INVERTER CONTROL DEVICE

(71) Applicant: AISIN AW CO., LTD., Anjo-shi, Aichi-ken (JP)

(72) Inventors: Subrata Saha, Anjo (JP); Arinori Shimada, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/126,097

(22) PCT Filed: Mar. 26, 2015

(86) PCT No.: PCT/JP2015/059406
§ 371 (c)(1),
(2) Date: Sep. 14, 2016

(87) PCT Pub. No.: WO2015/152002
PCT Pub. Date: Oct. 8, 2015

(65) Prior Publication Data
US 2017/0093323 A1  Mar. 30, 2017

(30) Foreign Application Priority Data
Mar. 31, 2014 (JP) .................. 2014-073588

(51) Int. Cl.
*H02P 27/06* (2006.01)
*H02P 29/02* (2016.01)
(Continued)

(52) U.S. Cl.
CPC ........ *H02P 29/024* (2013.01); *B60L 11/1803* (2013.01); *H02M 1/32* (2013.01);
(Continued)

(58) Field of Classification Search
USPC ............................................. 318/373–381, 139
See application file for complete search history.

(56) References Cited

U.S. PATENT DOCUMENTS 4,195,233 A * 3/1980 Udvardi-Lakos ..... H02M 7/517
307/66
4,263,535 A * 4/1981 Jones ...................... E02F 3/304
318/112
(Continued)

FOREIGN PATENT DOCUMENTS

| JP | 2008-011670 A | 1/2008 |
|----|---------------|--------|
| JP | 2010-220287 A | 9/2010 |
| JP | 2011-055582 A | 3/2011 |

OTHER PUBLICATIONS

Jun. 16, 2015 International Search Report issued in Patent Application No. PCT/JP2015/059406.

*Primary Examiner* — Bentsu Ro
(74) *Attorney, Agent, or Firm* — Oliff PLC

(57) ABSTRACT

An inverter control device for controlling a rotating electric machine drive device that includes an inverter and a DC link capacitor, the inverter being connected to a DC power supply via a contactor, being connected to an alternating current rotating electric machine, and performing power conversion between direct current and three-phase alternating current, an arm for each alternating current phase being formed by a series circuit including an upper side switching element and a lower side switching element, and the DC link capacitor smoothing a DC link voltage, which is a DC-side voltage of the inverter, the inverter control device performing switching control on the switching elements that form the inverter.

20 Claims, 8 Drawing Sheets

(51) Int. Cl.
  *H02P 29/024*    (2016.01)
  *H02M 1/32*      (2007.01)
  *H02M 1/36*      (2007.01)
  *H02M 7/5387*    (2007.01)
  *B60L 11/18*     (2006.01)
  *H02P 6/14*      (2016.01)

(52) U.S. Cl.
  CPC ........... *H02M 1/36* (2013.01); *H02M 7/5387* (2013.01); *H02P 6/14* (2013.01); *H02P 27/06* (2013.01)

(56) References Cited

U.S. PATENT DOCUMENTS

| | | | | |
|---|---|---|---|---|
| 4,654,770 | A | * | 3/1987 | Santurtun ................ H05G 1/54 361/93.9 |
| 8,369,049 | B2 | * | 2/2013 | Kuehner ............... B60L 3/0023 318/798 |
| 8,441,224 | B2 | | 5/2013 | Sumi et al. |

* cited by examiner

INVERTER CONTROL DEVICE

BACKGROUND

The present disclosure relates to technology for controlling driving of an alternating current rotating electric machine.

A high-output alternating current (AC) rotating electric machine used to power an electric automobile, a hybrid automobile, or the like is driven with a high voltage. Since the high-voltage power supply installed in such an automobile is a DC battery, DC power is converted into three-phase alternating current, for example, by an inverter circuit that uses switching elements. The rotating electric machine not only functions as a motor that outputs power for driving the vehicle using electrical energy, but also functions as a generator that generates electricity using kinetic energy from the vehicle, an internal combustion engine, or the like. Electrical power generated by the rotating electric machine is regenerated and stored in a battery.

Incidentally, there are cases where a switchgear (contactor) is provided between the battery and the rotating electric machine, or more specifically between the battery and the inverter. This contactor is a system main relay (SMR) that is constructed using relays, for example, and the contactor enters a conductive state with closed contact points if the vehicle ignition key (IG key) is in the on state (enabled state), and enters a non-conductive state with open contact points if the IG key is in the off state (non-enabled state). In other words, the battery and the inverter (and the rotating electric machine) are electrically connected when the SMR is in the closed state, and the electrical connection between the battery and the inverter (and the rotating electric machine) is cut off when the SMR is in the open state. During normal operation, the open/closed state of the SMR is also controlled according to the state of the IG key. However, even if the IG key is in the on state, there are cases where the SMR is opened due to a vehicle malfunction, collision, or the like. For example, if the supply of power to the SMR is cut off, if an abnormality occurs in the SMR drive circuit, if the SMR has a mechanical malfunction due to vibration, shock, noise, or the like, or if a disconnection occurs in an SMR peripheral circuit, it is possible for the contact points of the SMR to enter the open state, and for the contactor to enter the open state.

For this reason, if the contactor has entered the open state, there are cases where shutdown control (SD control) is implemented to switch all of the switching elements forming the inverter to the off state. A smoothing capacitor (DC link capacitor) for smoothing DC voltage (DC link voltage) is often provided on the DC side (in the DC link portion) of the inverter, and if SD control is implemented, the electrical power stored in the stator coil charges the smoothing capacitor via free wheel diodes (FWDs) that are connected in reverse-parallel to the switching elements. For this reason, it is possible for the voltage across the terminals of the smoothing capacitor (DC link voltage) to rise in a short period of time. Giving the smoothing capacitor a higher capacitance and higher withstand voltage to handle this rise in the DC link voltage leads to an increase in the physical size of the smoothing capacitor. This also requires the inverter to have a higher withstand voltage. This consequently hinders reduction of the size of the rotating electric machine drive device, and also influences parts cost, manufacturing cost, and product cost.

Also, when the contactor has entered the open state, there are cases where active short control (active short circuit control (ASC control)) for switching some of the switching elements to the on state to allow current reflux, such as zero vector sequence control (ZVS control), is executed. For example, JP 2011-55582A discloses a control method in which all of the switching elements on the upper side in the inverter are switched to the off state, and any one or more switching elements on the lower side are switched to the on state (JP 2011-55582A: FIG. 2; paragraphs 158, 159, 165, etc.). Although a rise in the DC link voltage can be suppressed with ASC control, a large current (reflux current) flows through the switching elements and the stator coil. Also, the large current continues to flow until the electrical power stored in the stator coil is consumed through heat or the like. For this reason, there is a possibility of wearing down the switching elements and the stator coil, and reducing their lifetime. Also, switching elements and the like that can handle a large current become necessary, and there is a possibility of also influencing parts cost, manufacturing cost, and product cost.

SUMMARY

In light of the aforementioned circumstances, there is desire for technology for, in the case where a contactor that connects an inverter and a DC power supply has entered the open state, suppressing a rise in the DC link voltage of the inverter and suppressing the total amount of reflux current, while also setting the amount of current flowing in the rotating electric machine to zero.

According to an exemplary aspect of the disclosure, an inverter control device for controlling a rotating electric machine drive device that includes an inverter and a DC link capacitor, the inverter being connected to a DC power supply via a contactor, being connected to an alternating current rotating electric machine, and performing power conversion between direct current and three-phase alternating current, an arm for each alternating current phase being formed by a series circuit including an upper side switching element and a lower side switching element, and the DC link capacitor smoothing a DC link voltage, which is a DC-side voltage of the inverter, the inverter control device performing switching control on the switching elements that form the inverter, the inverter control device including an electronic control unit that includes control logic, which when executed, executes partial shutdown control in which a switching element in an on state in a target arm that is an arm of any one phase is switched to an off state when the contactor enters an open state during rotation of the rotating electric machine, and thereafter executes full shutdown control in which, when currents in the arms of two phases different from the target arm both become zero, switching elements in the on state in all remaining arms are switched to the off state.

According to this configuration, in partial shutdown control, only one phase is shut down, thus limiting the flow of current that is hindered by shutdown, and reducing a rise in the DC link voltage. When there is a transition from partial shutdown control to full shutdown control, the current in the arms that are to be shut down is zero, and therefore the rise in the DC link voltage caused by the shutdown is reduced. Note that up to the time when partial shutdown control is started, normal control may be performed without performing special control, or active short control may be executed, for example. For example, in the case where active short control is executed, a rise in the DC link voltage is substantially limited from when the contactor has entered the open state until when active short control is started, and it is possible to greatly suppress a rise in the DC link voltage. In this way, according to this configuration, in the case where the contactor that connects the inverter and the DC power supply has entered the open state, it is possible to suppress a rise in the DC link voltage of the inverter and suppress the total amount of reflux current, while also setting the current flowing in the rotating electric machine to zero.

Further features and advantages of the present disclosure will become apparent from the following description of embodiments of the present disclosure described with reference to the drawings.

DETAILED DESCRIPTION OF EMBODIMENTS

Figure 1:
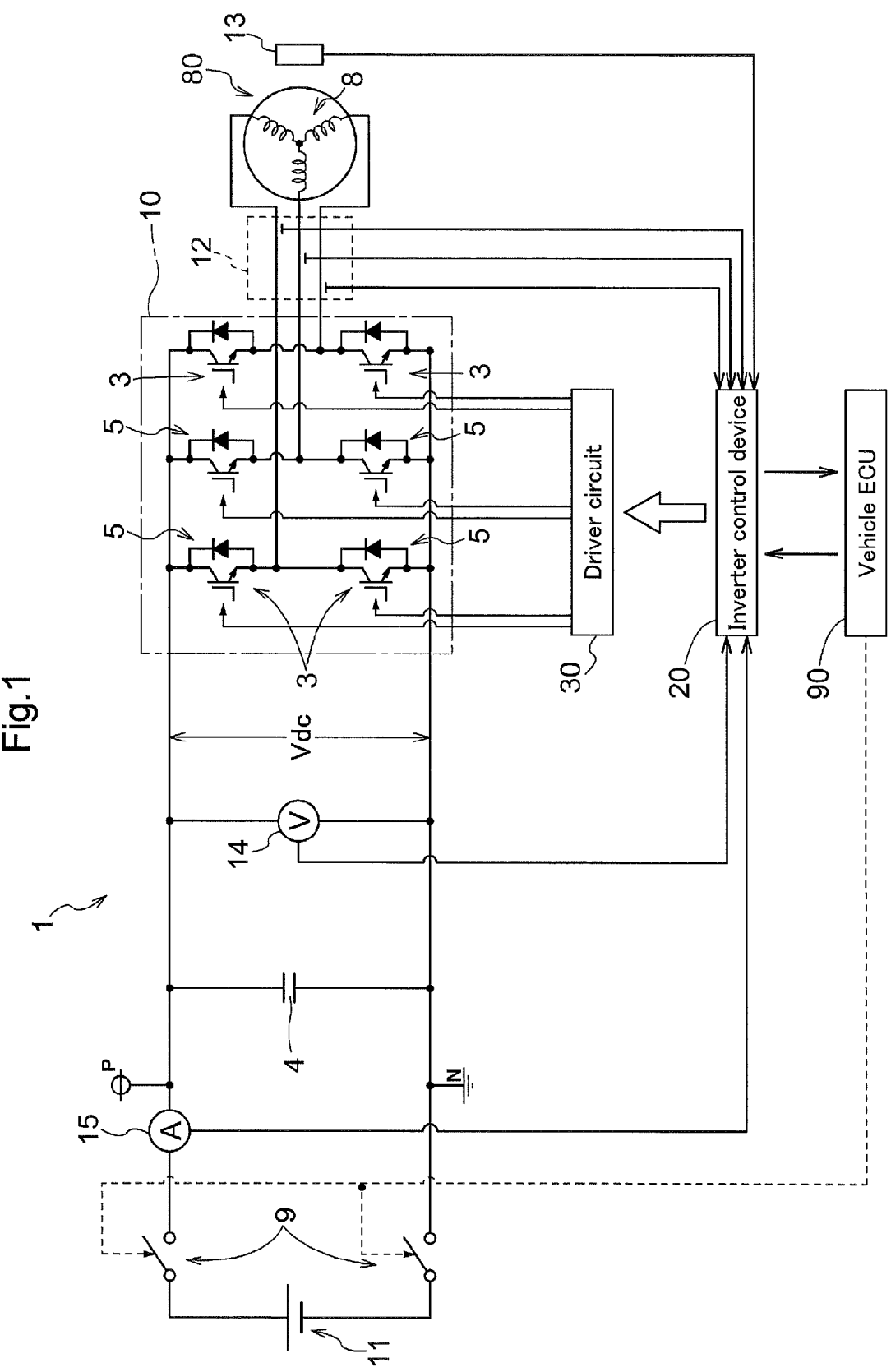
FIG. 1 is a circuit block diagram schematically showing a system configuration of a rotating electric machine drive device.

Hereinafter, an embodiment of an inverter control device will be described based on the drawings. As shown in FIG. 1, an inverter control device 20 is for controlling a rotating electric machine drive device 1 that includes an inverter 10 and a DC link capacitor 4, and controls driving of a rotating electric machine 80 via the rotating electric machine drive device 1. As will be described later, the inverter 10 is a power conversion device that is connected to a DC power supply (11) via a contactor 9, is connected to the AC rotating electric machine 80, and performs power conversion between direct current and polyphase alternating current (here, three-phase alternating current), and an arm for each alternating current phase is formed by a series circuit including an upper side switching element and a lower side switching element. The DC link capacitor 4 smooths a DC link voltage Vdc, which is the DC-side voltage of the inverter 10. The rotating electric machine 80, which is the target of driving by the rotating electric machine drive device 1 and the inverter control device 20 is a rotating electric machine that is the drive power source of a vehicle such as a hybrid automobile or an electric automobile. The rotating electric machine 80 serving as the drive power source of the vehicle is a rotating electric machine that operates using polyphase alternating current (here, three-phase alternating current), and can function as an electric motor and as a generator.

Vehicles such as automobiles, which cannot receive a supply of electrical power from an overhead line as with a railroad, are provided with a DC power supply as an electrical power supply for driving the rotating electric machine 80, examples of which include a secondary cell (battery) such as a nickel hydrogen cell or a lithium ion cell, and an electric double layer capacitor. In the present embodiment, a high voltage battery 11 (DC power supply) with a power supply voltage of 200 to 400 [V], for example, is provided as a high-voltage, high-capacity DC power supply for supplying electrical power to the rotating electric machine 80. Since the rotating electric machine 80 is an AC rotating electric machine, the inverter 10 for performing power conversion between direct current and alternating current (here, three-phase alternating current) is provided between the high-voltage battery 11 and the rotating electric machine 80. The voltage across a positive power supply line P and a negative power supply line N on the DC side of the inverter 10 is referred to hereinafter as "DC link voltage Vdc". The high-voltage battery 11 can supply electrical power to the rotating electric machine 80 via the inverter 10, and can store electrical power obtained due to power generation by the rotating electric machine 80.

A smoothing capacitor (the DC link capacitor 4) that smooths the voltage across the positive and negative electrodes on the DC side of the inverter 10 (DC link voltage Vdc) is provided between the inverter 10 and the high-voltage battery 11. The DC link capacitor 4 stabilizes the DC voltage (DC link voltage Vdc) that fluctuates according to fluctuations in the power consumption of the rotating electric machine 80. The contactor 9 that can cut the electrical connection between the high-voltage battery 11 and the circuit from the DC link capacitor 4 to the rotating electric machine 80 is provided between the DC link capacitor 4 and the high-voltage battery 11. In the present embodiment, this contactor 9 is a mechanical relay that opens and closes based on instructions from a vehicle ECU (Electronic Control Unit) 90, which is one of the highest ranking control devices of the vehicle, and the contactor 9 is referred to as the system main relay (SMR), for example. The contactor 9 enters a conductive state (connected state) with the SMR contact points closed when the ignition key (IG key) of the vehicle is in the on state (enabled state), and enters a non-conductive state (open state) with the SMR contact points open when the IG key is in the off state (non-enabled state). The inverter 10 is interposed between the high-voltage battery 11 and the rotating electric machine 80 via the contactor 9, the high-voltage battery 11 and the inverter 10 (and the rotating electric machine 80) are electrically connected when the contactor 9 is in the connected state, and the electrical connection between the high-voltage battery 11 and the inverter 10 (and the rotating electric machine 80) is cut off when the contactor 9 is in the open state.

The inverter 10 converts DC electrical power having the DC link voltage Vdc into polyphase (n phases, n being a natural number, and three phases being used here) AC electrical power and supplies it to the rotating electric machine 80, and converts AC electrical power generated by the rotating electric machine 80 into DC electrical power and supplies it to the DC power supply. The inverter 10 is configured to have multiple switching elements. It is preferable that the switching elements are power semiconductor elements capable of high frequency operation, such as an IGBT (Insulated Gate Bipolar Transistor), a power MOSFET (Metal Oxide Semiconductor Field Effect Transistor), a SiC-MOSFET (Silicon Carbide Metal Oxide Semiconductor FET), a SiC-SIT (SiC-Static Induction Transistor), or a GaN-MOSFET (Gallium Nitride-MOSFET). As shown in FIG. 1, IGBTs 3 are used as the switching elements in the present embodiment.

For example, the inverter 10 that performs power conversion between direct current and polyphase alternating current (here, three-phase alternating current) is formed by a bridge circuit that has arms respectively corresponding to the number of phases (here, three phases) as is widely known. Specifically, as shown in FIG. 1, two IGBTs 3 are connected in series between the DC positive side (the positive power supply line P on the positive side of the DC power supply) and the DC negative side (the negative power supply line Non the negative side of the DC power supply) of the inverter 10, thus forming one arm. In the case of three-phase alternating current, three (for three phases) series circuits (arms) are connected in parallel. In other words, the bridge circuit is configured having one series circuit (arm) for each of the stator coils 8 respectively corresponding to the U phase, the V phase, and the W phase of the rotating electric machine 80.

Figure 3:
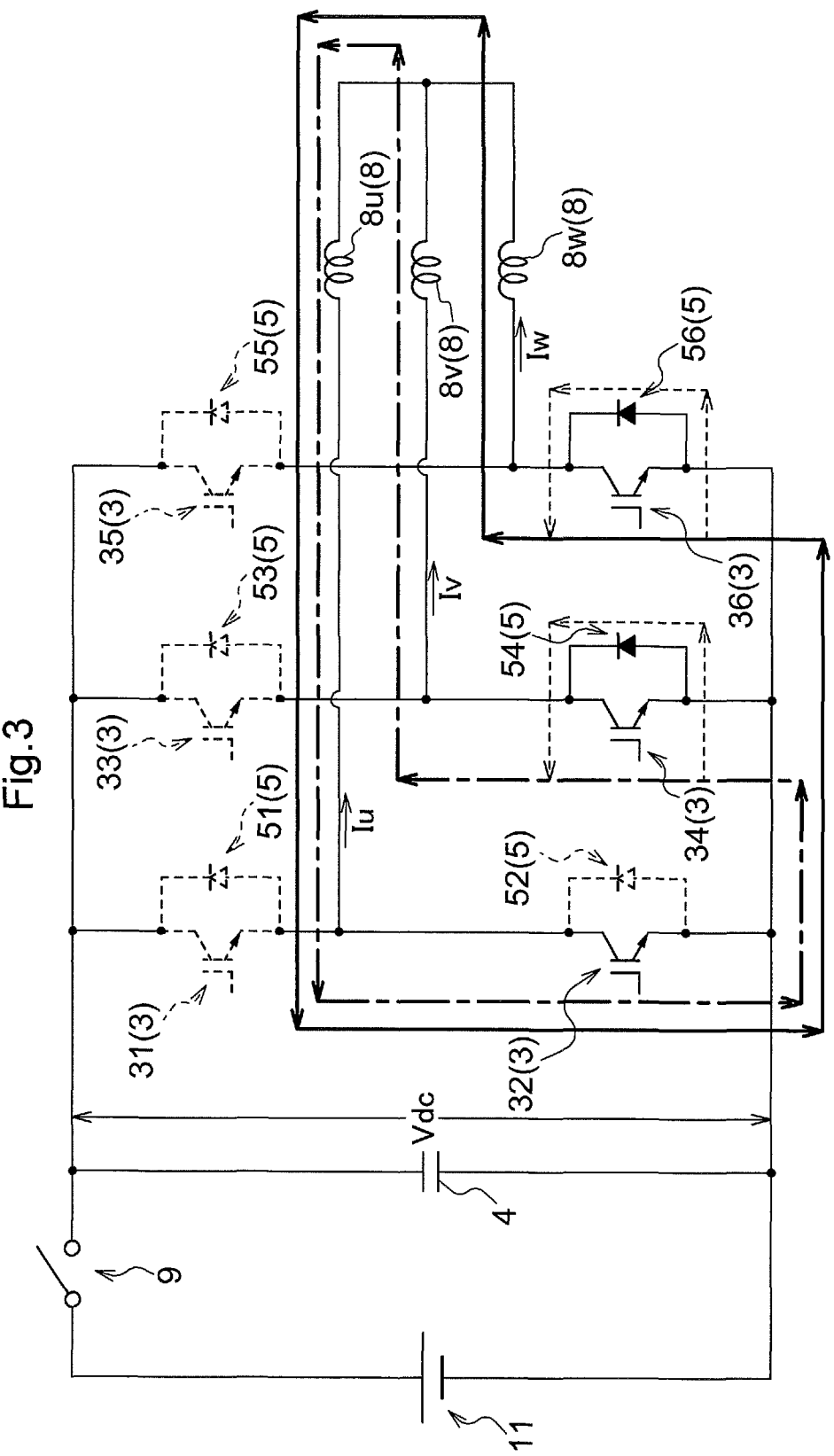
FIG. 3 is an equivalent circuit diagram showing an example of IGBT control and the flow of current in Phase1.

Intermediate points of the series circuits (arms) made up of a pair of IGBTs 3 for each phase, that is to say connection points between the IGBT 3 on the positive power supply line P side (upper side IGBTs (upper side switching elements) 31, 33, 35: see FIG. 3 for example) and the IGBT 3 on the negative power supply line N side (lower side IGBTs (lower side switching elements) 32, 34, 36: see FIG. 3 for example), are respectively connected to the stator coils 8 (8u, 8v, 8w: see FIG. 3 for example) of the rotating electric machine 80. Note that each of the IGBTs 3 is provided with a free wheel diode (FWD) 5 in parallel, with the direction from the negative electrode "N" toward the positive electrode "P" (the direction from the lower side toward the upper side) being the forward direction.

As shown in FIG. 1, the inverter 10 is controlled by the inverter control device 20. The inverter control device 20 is constructed with a logic circuit such as a microcomputer as the core member. For example, the inverter control device 20 controls the rotating electric machine 80 via the inverter 10 by performing current feedback control employing a vector control method based on a target torque TM of the rotating electric machine 80 that is provided as a request signal from another control device or the like, such as the vehicle ECU 90, via a CAN (Controller Area Network) or the like. The actual current flowing through the stator coils 8 for the various phases in the rotating electric machine 80 are detected by a current sensor 12, and the inverter control device 20 acquires the detection results. Also, the magnetic pole position of the rotor of the rotating electric machine 80 at various points in time is detected by a rotation sensor 13 such as a resolver, and the inverter control device 20 acquires the detection results. The inverter control device 20 executes current feedback control using the detection results from the current sensor 12 and the rotation sensor 13. The inverter control device 20 is configured to have various types of functional units for current feedback control, and the functional units are realized by cooperation between hardware such as the microcomputer and software (programs). Current feedback control is widely known, and thus will not be described in detail here.

In addition to the high-voltage battery 11, the vehicle is also provided with a low-voltage battery (not shown) that is a power supply with a lower voltage than the high-voltage battery 11. The power supply voltage of the low-voltage battery is 12 to 24 [V], for example. The low-voltage battery and the high-voltage battery 11 are insulated from each other, and are in a floating relationship with respect to each other. The low-voltage battery supplies electrical power to the inverter control device 20 and the vehicle ECU 90, as well as electrical components such as an audio system, a lighting system, interior lighting, instrument lighting, and power windows, and also control devices for controlling them. The power supply voltage supplied to the vehicle ECU 90, the inverter control device 20, and the like is 5 [V] or 3.3 [V], for example.

Incidentally, the gate terminals that are the control terminals of the IGBTs 3 forming the inverter 10 are connected to the inverter control device 20 via a driver circuit 30, and the switching thereof is controlled individually. A high voltage circuit for driving the rotating electric machine 80 and a low voltage circuit for, for example, the inverter control device 20 whose core is a microcomputer or the like have very different operating voltages (voltages supplied to the circuits). For this reason, for this reason, the driver circuit 30 (control signal drive circuit) is provided for raising and relaying the drive capability (e.g., voltage magnitude or output current, i.e., the capability to operate downstream circuits) of the gate drive signals (switching control signals) supplied to the IGBTs 3. The gate drive signals for the IGBTs 3 that were generated by the inverter control device 20, which is a low voltage circuit, pass through the driver circuit 30 and are supplied to the inverter 10 as gate drive signals for the high voltage circuit system. The driver circuit 30 is formed using insulated elements such as photocouplers or transformers and a driver IC.

As described above, the contactor 9 enters the connected state when the vehicle ignition key (IG key) is in the on state (enabled state), and enters the open state when the IG key is in the off state (non-enabled state). During normal operation, the open/closed state of the contactor 9 is also controlled according to the state of the IG key. However, even if the IG key is in the on state, there are cases where the contactor 9 enters the open state due to a vehicle malfunction, collision, or the like. For example, if the supply of power to the contactor 9 is cut off, if an abnormality occurs in the contactor 9 drive circuit, if the contactor 9 has a mechanical malfunction due to vibration, shock, noise, or the like, or if a disconnection occurs in a contactor 9 peripheral circuit, it is possible for the contactor 9 to enter the open state. When the contactor 9 enters the open state, the supply of electrical power from the high-voltage battery 11 to the inverter 10 side is immediately cut off. Similarly, the regeneration of electrical power from the rotating electric machine 80 to the high-voltage battery 11 via the inverter 10 is also cut off by the contactor 9.

For this reason, if the contactor 9 has entered the open state, there are cases where shutdown control (SD control) is implemented to switch all of the IGBTs 3 forming the inverter 10 to the off state.

If SD control is implemented, the electrical power stored in the stator coils 8 charges the DC link capacitor 4 via the FWDs 5. For this reason, it is possible for the voltage across the terminals of the DC link capacitor 4 (DC link voltage Vdc) to rise in a short period of time. Giving the DC link capacitor 4 a higher capacitance and higher withstand voltage in order to accommodate the rise in the DC link voltage Vdc leads to an increase in the physical size of the capacitor. This also requires the inverter 10 to have a higher withstand voltage. This consequently hinders reduction of the size of the rotating electric machine drive device 1, and also influences parts cost, manufacturing cost, and product cost.

Also, when the contactor 9 has entered the open state, there are cases where active short control (active short circuit control (ASC control)) for switching some of the IGBTs 3 to the on state to allow current reflux, such as zero vector sequence control (ZVS control), is executed. The energy of the current (reflux current) is consumed by heat or the like in the IGBTs 3, the stator coils 8, and the like. Although a rise in the DC link voltage Vdc can be suppressed with ASC control, a large current flows through the IGBTs 3 and the stator coils 8. The reflux current continues to flow until the electrical power stored in the stator coils 8 is consumed, and thus there is a possibility of reducing the lifetime of the IGBTs 3 and the stator coils 8. Also, elements and the like that can handle a large current become necessary, and there is a possibility of also influencing parts cost, manufacturing cost, and product cost. Moreover, the magnetization of the permanent magnet provided on the rotor of the rotating electric machine 80 is reduced by heat generated by the large current or the like, and there is also a possibility of reducing the durability of the rotating electric machine 80.

A feature of the inverter control device 20 of the present embodiment is that SD control and ASC control are combined to execute control (regenerative electrical power suppression control) for suppressing regenerative electrical power while also setting the current flowing in the rotating electric machine 80 to zero. Specifically, when the contactor 9 that connects the inverter 10 and the high-voltage battery 11 has entered the open state, the inverter control device 20 suppresses a rise in the DC link voltage Vdc and suppresses the total amount of reflux current, while also setting the current flowing in the rotating electric machine 80 to zero. Note that as described above, a low-voltage battery (not shown) separate from the high-voltage battery 11 is provided, and the inverter control device 20 and the vehicle ECU 90 operate using electrical power supplied from the low-voltage battery. In the description of the present embodiment, it is assumed that even if the contactor 9 enters the open state, the supply of electrical power from the low-voltage battery to the inverter control device 20 and the vehicle ECU 90 is maintained.

As shown in FIGS. 1, 3, and the like, each arm of the inverter 10 for one alternating current phase is formed by a series circuit including an upper side switching element (upper side IGBT (31, 33, 35)) and a lower side switching element (lower side IGBT (32, 34, 36)) that are switched complementarily. In the case where the contactor 9 has entered the open state during rotation of the rotating electric machine 80, the inverter control device 20 executes either of two types of active short control (ASC control), namely upper side active short control (upper side ASC control) in which the upper side IGBTs (31, 33, 35) in all of the arms of the three phases are switched to the on state, and the lower side IGBTs (32, 34, 36) in all of the arms of the three phases are switched to the off state, and lower side active short control (lower side ASC control) in which the lower side IGBTs (32, 34, 36) in all of the arms of the three phases are switched to the on state, and the upper side IGBTs (31, 33, 35) in all of the arms of the three phases are switched to the off state (FIG. 2: Phase1). Furthermore, after the start of ASC control, when the current becomes zero in the target arm, which is the arm for any one of the three phases, the inverter control device 20 executes partial shutdown control (PSD control) in which the IGBT 3 in the on state in at least the target arm is switched to the off state (FIG. 2: Phase2). Thereafter, when the currents in the arms of the two phases other than the target arm both become zero, the inverter control device 20 executes full shutdown control (FSD control) in which the IGBTs 3 in the on state in the all of the remaining arms are switched to the off state (FIG. 2: Phase3).

Figure 2:
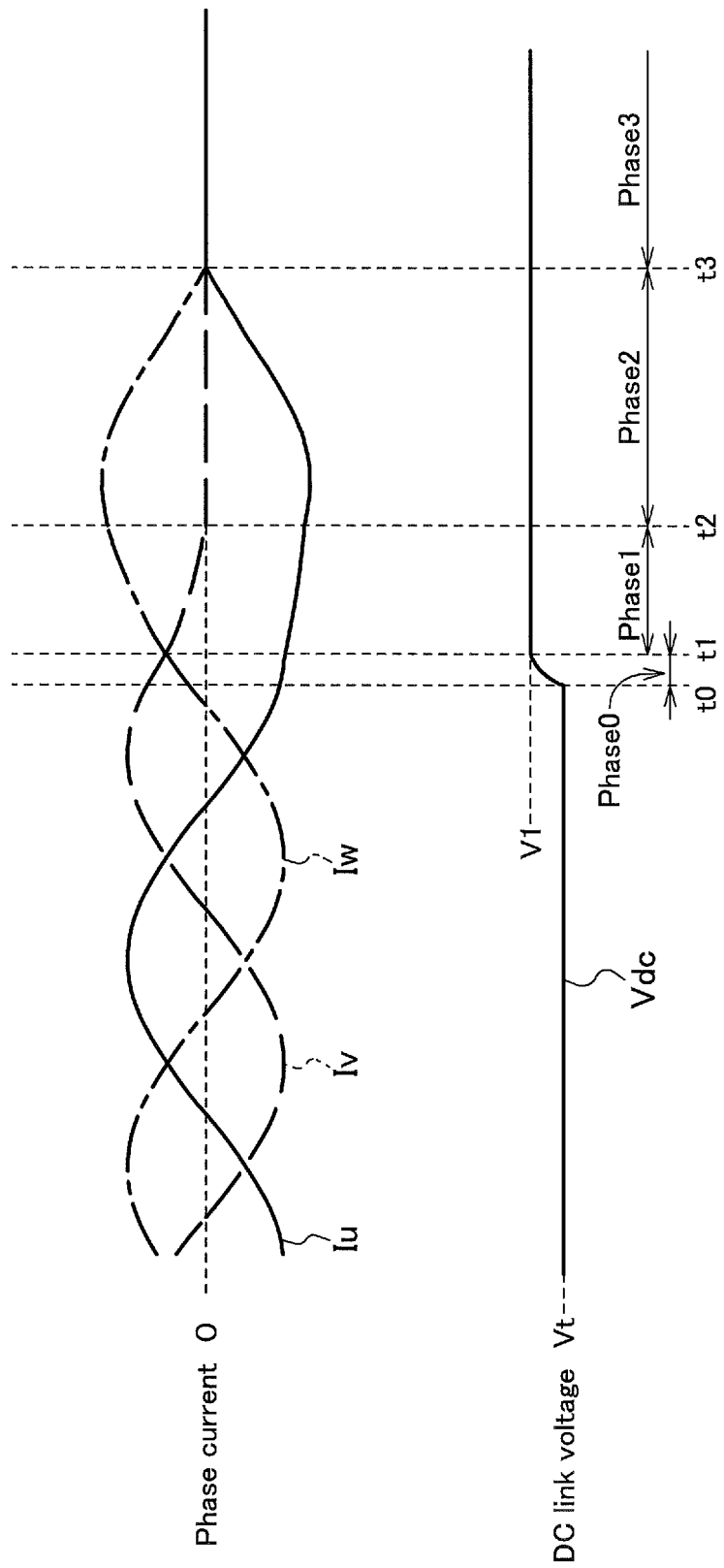
FIG. 2 is a waveform diagram schematically showing an example of control when a contactor is open.

Hereinafter, this regenerative electrical power suppression control will be described. FIG. 2 is a waveform diagram schematically showing an example of control when the contactor 9 is open, FIG. 3 is an equivalent circuit diagram showing an example of control of the IGBTs 3 and the flow of current in above-described Phase1, and FIG. 4 likewise is an equivalent circuit diagram showing an example of control of the IGBTs 3 and the flow of current in Phase2. When the contactor 9 enters the open state at a time "t0" shown in FIG. 2, the DC link voltage Vdc begins to rise (Phase0). Upon determining that the contactor 9 is in the open state (contactor is open), the inverter control device 20 starts regenerative electrical power suppression control. The determination that the contactor is open may be made based on communication from the vehicle ECU 90, or may be made based on a detection result from a voltage sensor 14 that detects the DC link voltage Vdc, for example. Also, the determination that the contactor is open may be made based on a rapid change in the current in the high-voltage battery 11 (battery current) detected by a battery current sensor 15. Here, it is assumed that the start of regenerative electrical power suppression control is determined based on whether or not the DC link voltage Vdc detected by the voltage sensor 14 exceeds a determination threshold value for determining whether or not regenerative electrical power suppression control is necessary.

When regenerative electrical power suppression control is started, ASC control is executed first. The following describes an example in which lower side ASC control is executed, as shown in FIG. 3. In FIG. 3, the IGBTs 3 shown by dashed lines have been switched to the off state, and the IGBTs 3 shown by solid lines have been switched to the on state. Also, the FWDs 5 shown by dashed lines are in the non-conductive state, and the FWDs 5 shown by solid lines are in the conductive state. As shown in FIG. 3, the upper side IGBTs (31, 33, 35) are switched to the off state, and the lower side IGBTs (32, 34, 36) are switched to the on state. A U phase current Iu flows through the U phase lower side IGBT 32. A V phase current Iv flows through the V phase lower side IGBT 34, and also flows through the V phase lower side FWD 54 that is connected in reverse parallel to the V phase lower side IGBT 34. Similarly, a W phase current Iw flows through the W phase lower side IGBT 36, and also flows through the W phase lower side FWD 56 that is connected in reverse parallel to the W phase lower side IGBT 36.

As shown in FIG. 2, when the contactor 9 enters the open state at the time "t0", the DC link voltage Vdc begins to rise, and then when lower side ASC control is executed at a time "t1", current reflux occurs as shown in FIG. 3, and thus the rise of the DC link voltage Vdc stops at a voltage "V1". The period for which lower side ASC control is executed corresponds to Phase1.

When the current (phase current) in the arm of one of the phases (target arm) becomes zero in the Phase1 period, that is to say during the execution of ASC control, PSD control is executed. It is preferable that PSD control is executed at a time "t2" shown in FIG. 2, but this is not strictly necessary, and it need only be executed at a time around the time "t2". The execution of PSD control will be late if it is executed after detection of the current becoming zero, and therefore it is preferable that PSD control is executed in anticipation of the phase current becoming zero, for example. FIG. 2 shows an example of a mode in which PSD control is executed when the V phase current Iv becomes zero in the Phase1 period. The target arm is the V phase arm, and at least the V phase lower side IGBT 34 in the on state in the V phase arm is switched to the off state. Accordingly, the V phase enters a shutdown state, and the inverter 10 enters a partially shutdown state (Phase2). When shutdown has been implemented, the electrical power stored in the stator coils 8 charges the DC link capacitor 4 via the FWDs 5, but shutdown has been executed in the state in which the phase current (Iv) is zero, and therefore the DC link voltage Vdc does not rise.

Meanwhile, as described above, the V phase current Iv flows through the V phase lower side IGBT 34, and also flows through the V phase lower side FWD 54 that is connected in reverse parallel to the V phase lower side IGBT 34. Accordingly, it can also be said that at the time of execution of PSD control, the inverter control device 20 performs control such that when the current flowing through the FWD 5 in the conductive state (here, the V phase lower side FWD 54) in the forward direction becomes zero, the IGBT 3 (here, the V phase lower side IGBT 34) connected in parallel to that FWD 5 (54) is switched to the off state.

Also, in Phase2, the V phase enters the shutdown state, and the inverter 10 enters the partially shutdown state, and therefore the control performed from the time "t2" onward is called partial shutdown control (PSD control), but from a different viewpoint, it can be said that partial active short control (ASC control) is being executed. Accordingly, the control executed from the time "t2" onward (the control executed in Phase2) can also be called partial active short control (PASC control).

Figure 4:
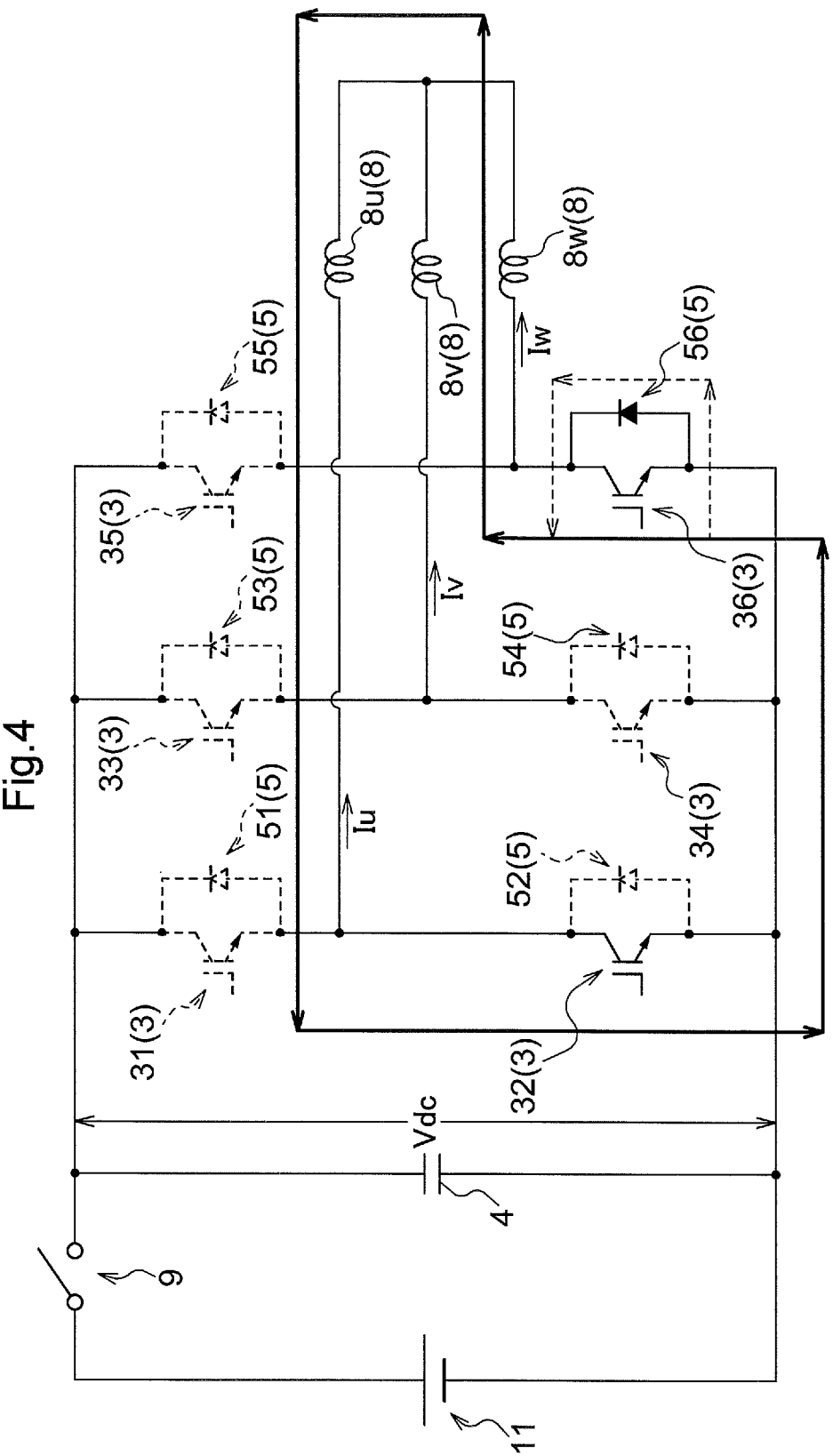
FIG. 4 is an equivalent circuit diagram showing an example of IGBT control and the flow of current in Phase2.

FIG. 4 shows an example of control of the IGBTs 3 and the flow of current in Phase2. As shown in FIG. 4, the U phase current Iu flows through the U phase lower side IGBT 32, and the W phase current Iw flows through the W phase lower side IGBT 36 and also flows through the W phase lower side FWD 56 connected in reverse parallel to the W phase lower side IGBT 36. Since the V phase has been shut down, the U phase current Iu and the W phase current Iw are in equilibrium. Accordingly, as shown in FIG. 2, the U phase current Iu and the W phase current Iw become zero at the same time (here, a time "t3"). Then, when the currents in the arms of the two phases (here, the U phase and the W phase) other than the target arm (here, the V phase) both become zero, the inverter control device 20 executes FSD control in which the IGBTs 3 (here, "32, 36") in the on state in the all of the remaining arms are switched to the off state (FIG. 2: Phase3). When shutdown has been implemented, the electrical power stored in the stator coils 8 charges the DC link capacitor 4 via the FWDs 5, but shutdown has been executed in the state in which the phase current (Iu, Iw) is zero, and therefore the DC link voltage Vdc does not rise.

In this way, by combining SD control and ASC control, it is possible to execute control for appropriately setting the current flowing in the rotating electric machine 80 to zero. According to simulations performed by the inventors, it was confirmed that compared to the case of simply executing SD control in response to the contactor open state, the risen voltage of the DC link voltage Vdc can be reduced to approximately ⅕ to ¼ even if the capacitance of the DC link capacitor 4 is reduced to approximately ½, for example. In other words, a rise in the DC link voltage Vdc is suppressed by regenerative electrical power suppression control, and it is also possible to reduce the size of the DC link capacitor 4. Also, compared to the case of simply executing ASC control in response to the contactor open state, the highest value of the phase current falls within approximately 80%. In other words, phase current is also suppressed by regenerative electrical power suppression control. Accordingly, reduction in the lifetime of the stator coils 8 and the IGBTs 3 due to being worn down can be suppressed. In other words, through simulations, it was confirmed that the rated current and withstand voltage are satisfied under the conditions of the maximum regenerative electrical power point and maximum voltage of the inverter 10.

Meanwhile, as shown in FIGS. 3 and 4, in both Phase1 and Phase2, the W phase current Iw flows through the W phase lower side IGBT 36, and also flows through the W phase lower side FWD 56 that is connected in reverse parallel to the W phase lower side IGBT 36. In other words, in Phase2, reflux of the W phase current Iw occurs even if the W phase lower side IGBT 36 is in the off state. Accordingly, when PSD control starts at the time "t2", the V phase lower side IGBT 34 and the W phase lower side IGBT 36 may be switched to the off state. In other words, the inverter control device 20 can execute PSD control as follows. Specifically, the inverter control device 20 may perform control so as to switch off two IGBTs 3, namely the IGBT 3 (here, "34") in the on state in the target arm (here, the V phase), and the IGBT 3 (36) that is connected in parallel to the FWD 5 (here, "56") that is in the conductive state in the forward direction out of the IGBTs 3 (32, 36) in the on state in the arms of the two phases (here, the U phase and the W phase) other than the target arm, to execute PSD control. In other words, the inverter control device 20 may perform control so as to switch off, out of the IGBTs 3 (here, "32, 34, 36") in the on state, the two IGBTs 3 (here, "34, 36") that are connected in parallel to the FWDs 5 (here, "54, 56") in the conductive state in the forward direction, to execute PSD control.

In this way, if control is performed so as to switch two IGBTs 3 to the off state to execute PSD control, only the U phase lower side IGBT 32 is an IGBT 3 in the on state in Phase2. In other words, when FSD control starts at the time "t3", only the U phase lower side IGBT 32 is an IGBT 3 in the on state in all of the remaining arms when the currents in the arms of the two phases (here, the U phase and the W phase) other than the target arm (here, the V phase) have both become zero. When starting FSD control, the inverter control device 20 switches the U phase lower side IGBT 32 to the off state as the IGBT 3 in the on state in all of the remaining arms when the currents in the arms of the two phases (here, the U phase and the W phase) other than the target arm (here, the V phase) have both become zero (FIG. 2: Phase3).

Figure 5:
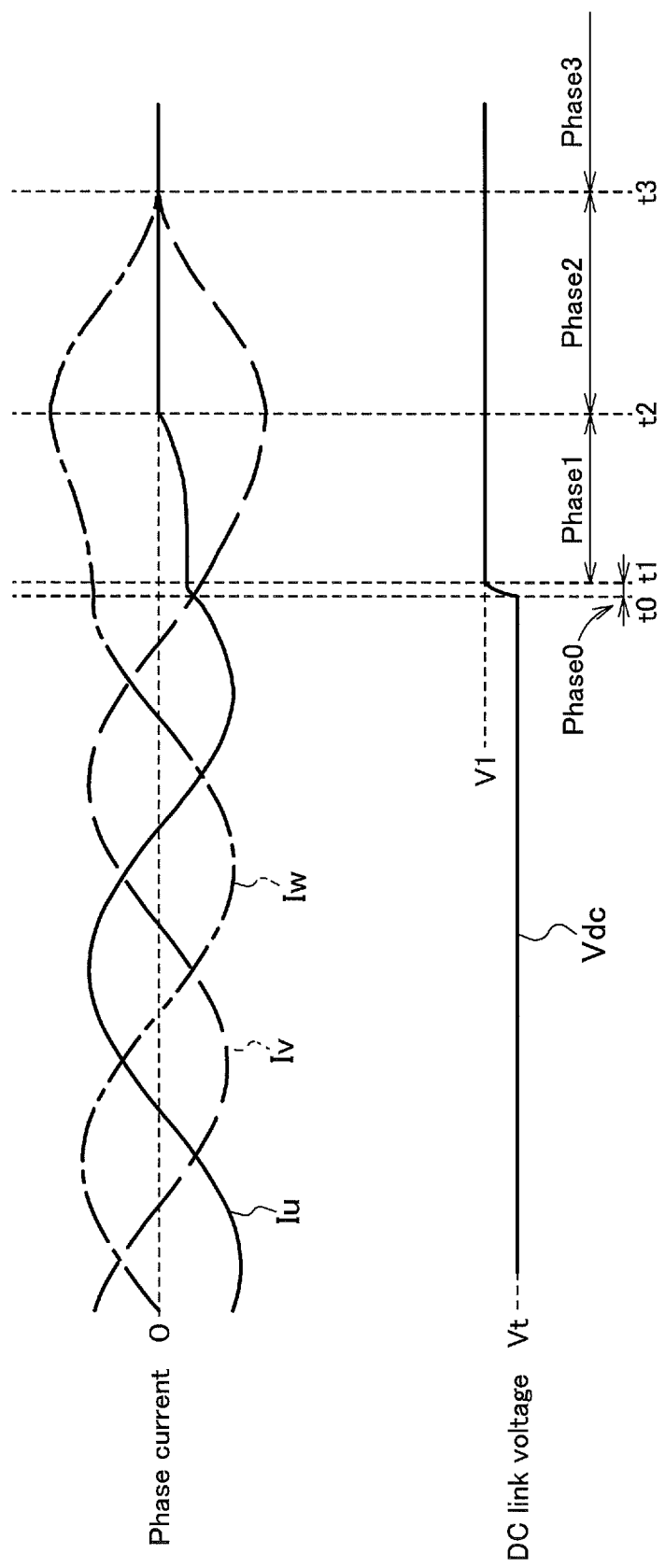
FIG. 5 is a waveform diagram schematically showing another example of control when the contactor is open.
Figure 6:
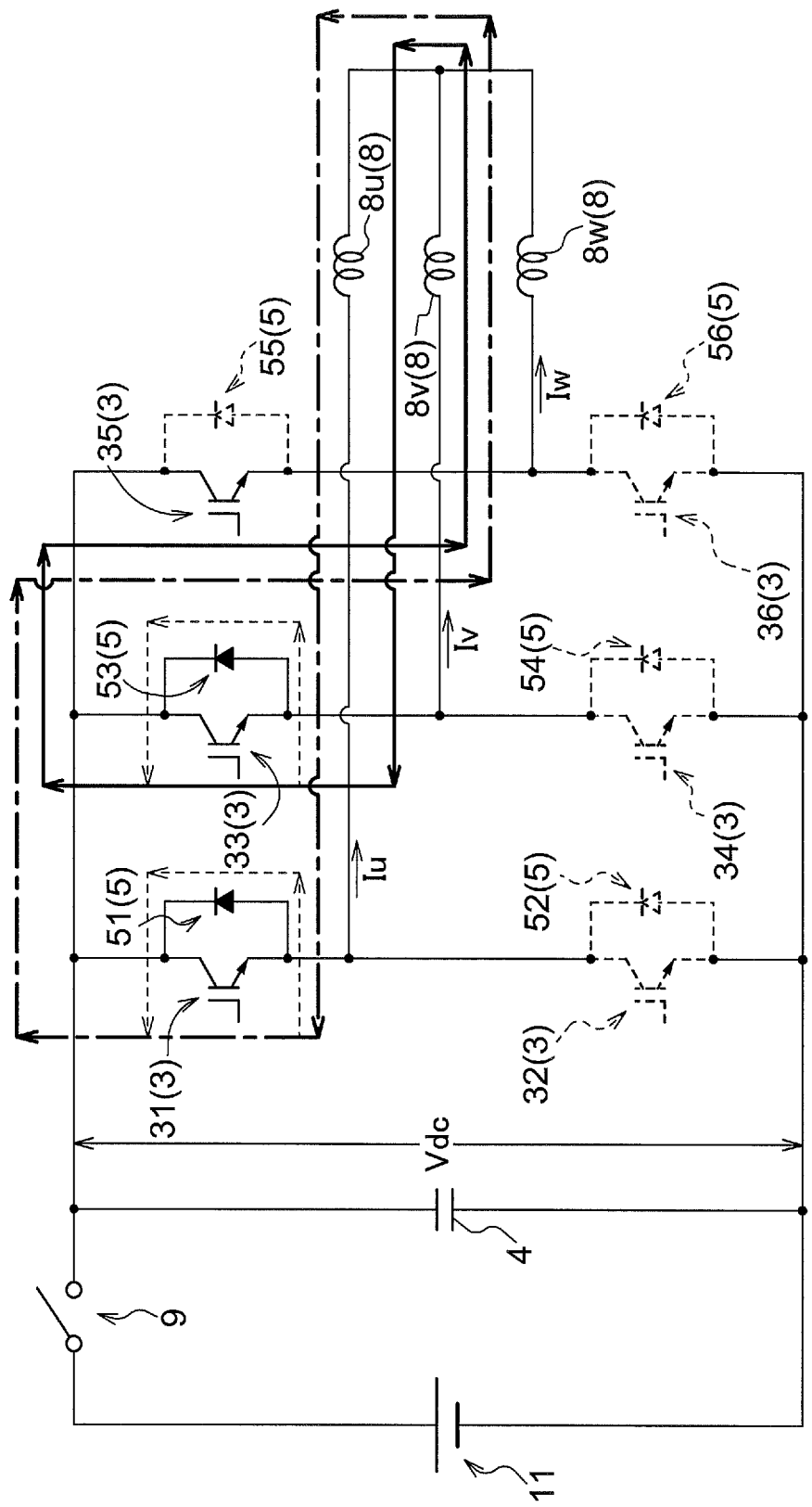
FIG. 6 is an equivalent circuit diagram showing an example of IGBT control and the flow of current in Phase1.

Whereas the example of executing lower side ASC control as ASC control is described above, the following describes a mode in which upper side ASC control is executed as ASC control. In other words, the following describes a mode in which upper side ASC control, PSD control, and FSD control are executed in the stated order as regenerative electrical power suppression control. FIG. 5 is a waveform diagram schematically showing an example of control when the contactor 9 is open, FIG. 6 is an equivalent circuit diagram showing an example of control of the IGBTs 3 and the flow of current in above-described Phase1, and FIG. 7 likewise is an equivalent circuit diagram showing an example of control of the IGBTs 3 and the flow of current in Phase2. When the contactor 9 enters the open state at a time "t0" shown in FIG. 5, the DC link voltage Vdc begins to rise. Upon determining that the contactor 9 is in the open state (contactor is open), the inverter control device 20 starts regenerative electrical power suppression control.

When regenerative electrical power suppression control is started, ASC control is executed first. Here, as shown in FIG. 6, upper side ASC control is executed, and therefore the upper side IGBTs (31, 33, 35) are switched to the on state, and the lower side IGBTs (32, 34, 36) are switched to the off state. The W phase current Iw flows through the W phase upper side IGBT 35. The U phase current Iu flows through the U phase upper side IGBT 31, and also flows through the U phase upper side FWD 51 that is connected in reverse parallel to the U phase upper side IGBT 31. Similarly, the V phase current Iv flows through the V phase upper side IGBT 33, and also flows through the V phase upper side FWD 53 that is connected in reverse parallel to the V phase upper side IGBT 33.

As shown in FIG. 5, when the contactor 9 enters the open state at the time "t0", the DC link voltage Vdc begins to rise, and then when lower side ASC control is executed at a time "t1", current reflux occurs as shown in FIG. 6, and thus the rise of the DC link voltage Vdc stops at a voltage "V1". The period for which upper side ASC control is executed corresponds to Phase1.

When the current (phase current) in the arm of one of the phases (target arm) becomes zero in the Phase1 period, that is to say during the execution of ASC control, PSD control is executed. Here, PSD control is executed when the U phase current Iu becomes zero in the Phase1 period. The target arm is the U phase arm, and at least the U phase upper side IGBT 31 in the on state in the U phase arm is switched to the off state. Accordingly, the U phase enters a shutdown state, and the inverter 10 enters a partially shutdown state (Phase1). When shutdown has been implemented, the electrical power stored in the stator coils 8 charges the DC link capacitor 4 via the FWDs 5, but shutdown has been executed in the state in which the phase current (Iu) is zero, and therefore the DC link voltage Vdc does not rise.

The U phase current Iu flows through the U phase upper side IGBT 31, and also flows through the U phase upper side FWD 51 that is connected in reverse parallel to the U phase upper side IGBT 31. Accordingly, it can also be said that the inverter control device 20 performs control such that when the current flowing in the forward direction through the FWD 5 in the conductive state (here, the U phase upper side FWD 51) becomes zero, the IGBT 3 (here, the U phase upper side IGBT 31) connected in parallel to that FWD 5 (51) is switched to the off state, to execute PSD control. In this state, only two phases out of the three phases have been switched to the on state, and therefore this can be called two phase switching control.

Figure 7:
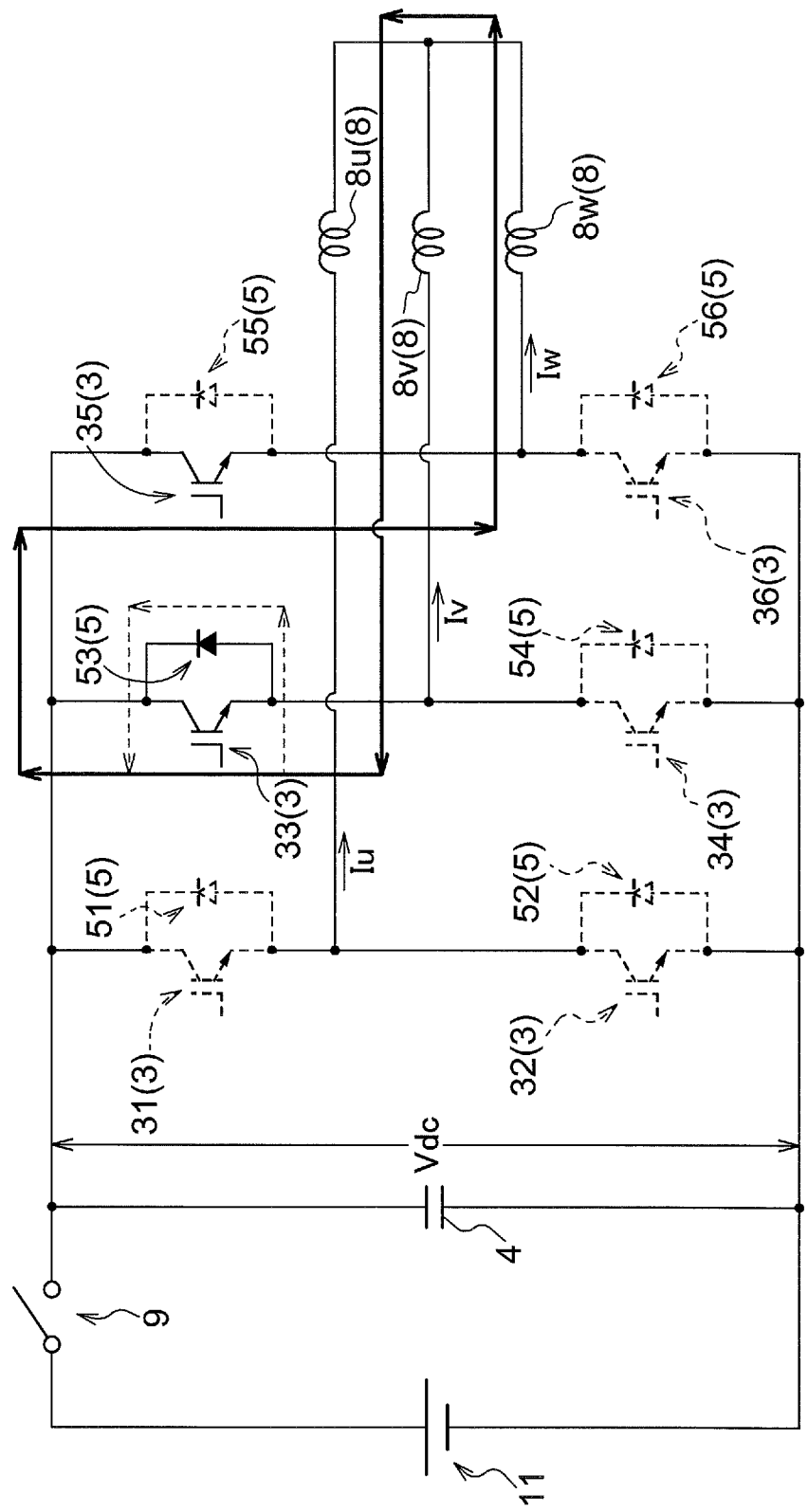
FIG. 7 is an equivalent circuit diagram showing an example of IGBT control and the flow of current in Phase2.

FIG. 7 shows an example of control of the IGBTs 3 and the flow of current in Phase2. As shown in FIG. 7, the W phase current Iw flows through the W phase upper side IGBT 35, and the V phase current Iv flows through the V phase upper side IGBT 33, and also flows through the V phase upper side FWD 53 that is connected in reverse parallel to the V phase upper side IGBT 33. Since the U phase has been shut down, the V phase current Iv and the W phase current Iw are in equilibrium. Accordingly, the V phase current Iv and the W phase current Iw become zero at the same time (here, the time "t3"). Then, when the currents in the arms of the two phases (here, the V phase and the W phase) other than the target arm (here, the U phase) both become zero, the inverter control device 20 executes FSD control in which the IGBTs 3 (here, "33, 35") in the on state in the all of the remaining arms are switched to the off state (FIG. 5: Phase3). When shutdown has been implemented, the electrical power stored in the stator coils 8 charges the DC link capacitor 4 via the FWDs 5, but shutdown has been executed in the state in which the phase current (Iv, Iw) is zero, and therefore the DC link voltage Vdc does not rise.

Meanwhile, as shown in FIGS. 6 and 7, in both Phase1 and Phase2, the V phase current Iv flows through the V phase upper side IGBT 33, and also flows through the V phase upper side FWD 53 that is connected in reverse parallel to the V phase upper side IGBT 33. In other words, in Phase2, reflux of the V phase current Iv occurs even if the V phase upper side IGBT 33 is in the off state. Accordingly, when PSD control starts at the time "t2", the U phase upper side IGBT 31 and the V phase upper side IGBT 33 may be switched to the off state. Specifically, the inverter control device 20 may perform control so as to switch off two IGBTs 3, namely the IGBT 3 (here, "31") in the on state in the target arm (here, the U phase), and the IGBT 3 (33) that is connected in parallel to the FWD 5 (here, "53") that is in the conductive state in the forward direction out of the IGBTs 3 (33, 35) in the on state in the arms of the two phases (here, the V phase and the W phase) other than the target arm, to execute PSD control. In other words, the inverter control device 20 may perform control so as to switch off, out of the IGBTs 3 (here, "31, 33, 35") in the on state, the two IGBTs 3 (here, "31, 33") that are connected in parallel to the FWDs 5 (here, "51, 53") in the conductive state in the forward direction, to execute PSD control.

In this way, in the case where two IGBTs 3 are switched to the off state to execute PSD control, only the W phase upper side IGBT 35 is an IGBT 3 in the on state in Phase2. In this state, only one phase out of the three phases has been switched to the on state, and therefore this can be called single phase switching control. In other words, when FSD control starts at the time "t3", only the W phase upper side IGBT 35 is an IGBT 3 in the on state in all of the remaining arms when the currents in the arms of the two phases (here, the V phase and the W phase) other than the target arm (here, the U phase) have both become zero. When starting FSD control, the inverter control device 20 switches the W phase upper side IGBT 35 to the off state as the IGBT 3 in the on state in all of the remaining arms when the currents in the arms of the two phases (here, the V phase and the W phase) other than the target arm (here, the U phase) have both become zero (FIG. 5: Phase3).

As described above, the ASC control executed in Phase1 may be upper side ASC control or lower side ASC control. It is preferable that at the time of contactor opening, the inverter control device 20 selects either upper side ASC control or lower side ASC control in accordance with the current phase of the arms of the three phases, and executes the selected ASC control. Specifically, it is preferable that, as shown in FIG. 3, lower side ASC control is selected in the case where the waveforms of the currents of two phases out of the three phases are on the positive side and the waveform of one phase is on the negative side at the time of contactor opening (at the time "to"), and as shown in FIG. 6, upper side ASC control is selected in the case where the waveforms of the currents of two phases out of the three phases are on the negative side and the waveform of one phase is on the positive side at the time of contactor opening.

Table 1 below shows the waveforms of the currents for the three phases, and the on/off states of the IGBTs 3. As shown in Table 1, there are six states according to the waveforms of the currents for the three phases (Iu, Iv, Iw). These states are indicated under "Sector". In this table, "Su+, Sv+, Sw+, Su−, Sv−, Sw−" respectively indicate the U phase upper side IGBT 31, the V phase upper side IGBT 33, the W phase upper side IGBT 35, the U phase lower side IGBT 32, the V phase lower side IGBT 34, and the W phase lower side IGBT 36. Specifically, "S" indicates "switching element", the indices "u, v, w" indicate the three phases, "+" indicates "upper side", and "−" indicates "lower side". Also, "0" in the table indicates the off state, and "1" indicates the on state. Accordingly, in Sectors 1, 3, and 5, which are cases where the current waveforms of two phases out of the three phases are on the positive side of the amplitude center, lower side ASC control is executed. On the other hand, in Sectors 2, 4, and 6, which are cases where the current waveforms of two phases out of the three phases are on the negative side of the amplitude center, upper side ASC control is executed, Table 1: current waveforms for three phases and on/off states of switching elements during ASC control

TABLE 1

| Sector | Iu | Iv | Iw | Su+ | Sv+ | Sw+ | Su− | Sv− | Sw− |
|---|---|---|---|---|---|---|---|---|---|
| 1 | + | − | + | 0 | 0 | 0 | 1 | 1 | 1 |
| 2 | + | − | − | 1 | 1 | 1 | 0 | 0 | 0 |
| 3 | + | + | − | 0 | 0 | 0 | 1 | 1 | 1 |
| 4 | − | + | − | 1 | 1 | 1 | 0 | 0 | 0 |
| 5 | − | + | + | 0 | 0 | 0 | 1 | 1 | 1 |
| 6 | − | − | + | 1 | 1 | 1 | 0 | 0 | 0 |

In the case where the current waveforms of two phases out of the three phases are on the positive side and the current waveform of one phase is on the negative side, there are two phases for which the lower side FWDs 5 are conductive during the execution of lower side ASC control. Also, in the case where the current waveforms of two phases out of the three phases are on the negative side and the current waveform of one phase is on the positive side, there are two phases for which the upper side FWDs 5 are conductive during the execution of upper side ASC control. Accordingly, there are one or two IGBTs 3 that can be switched to the off state when PSD control is to be performed, thus increasing the number of options in control. Also, as described above, two IGBTs 3 can be caused to transition from the on state to the off state when moving to PSD control, and therefore it is possible to suppress the wearing down of the IGBTs 3 due to the flow of a large current, and also reduce the influence on their lifetime.

Figure 8:
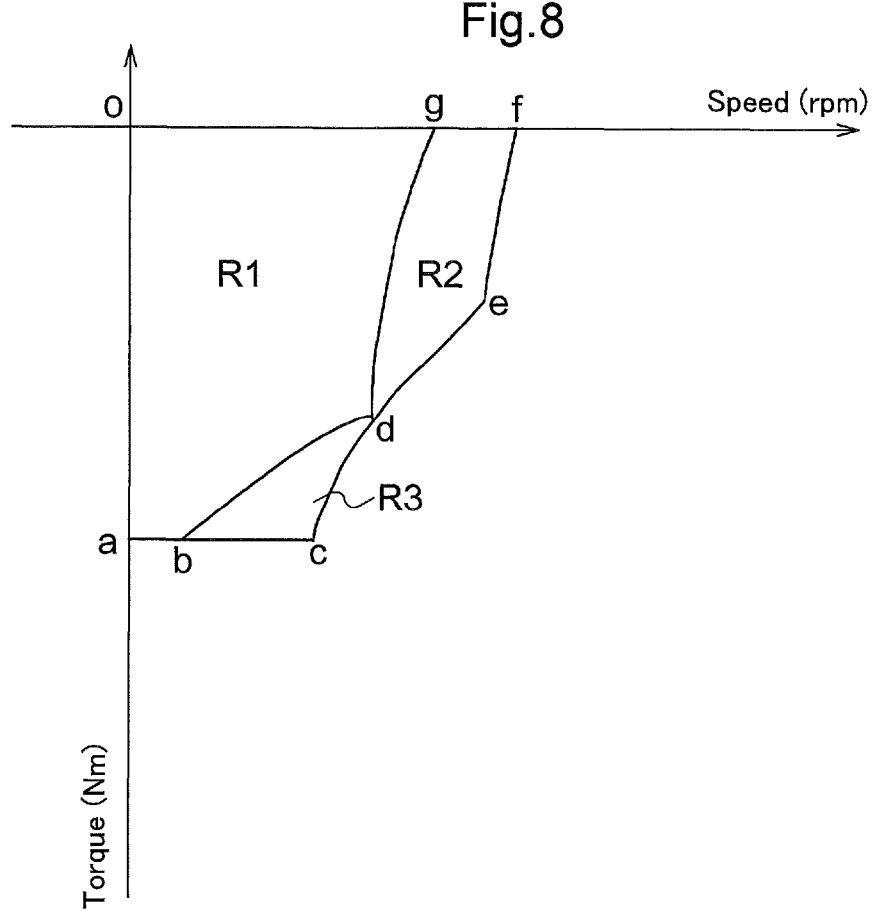
FIG. 8 is a diagram showing a relationship between a control method applied when the contactor is open and the operating state of the rotating electric machine.

The inverter control device 20 of the present embodiment combines SD control and ASC control to execute regenerative electrical power suppression control (SD-ASC combined control) for appropriately setting the current flowing in the rotating electric machine 80 to zero. SD control, ASC control, and SD-ASC combined control each have an appropriate region according to the operating state of the rotating electric machine 80 at the time of contactor opening. FIG. 8 shows regions in which the respective control methods are appropriate in an operation map represented by the rotational speed and the torque of the rotating electric machine 80. In the region with a high rotational speed, which is the region "defg" (region "R2") in FIG. 8, the electromotive force (EMF) of the rotating electric machine 80 is high, and therefore ASC control is appropriate. The line "dg" indicates the boundary at which the back electromotive force (BEMF) reaches or exceeds the DC link voltage Vdc. In the region with a low rotational speed, which is the region "0acdg" (region "R1+R3") in FIG. 8, SD control is appropriate. In other words, SD control is executed in the case where the DC link voltage Vdc is higher than the electromotive force generated by the rotating electric machine 80.

If the inverter control device 20 is constructed such that SD control can be performed in the entirety of the region "0acdg" in which SD control is appropriate, it is necessary to perform design in view of the rise in the DC link voltage Vdc in that region. For example, the switching elements such as the IGBTs 3 are required to have a high withstand voltage, and the DC link capacitor 4 is also required to have a high capacitance and high withstand voltage. However, if the rise in the DC link voltage Vdc can be suppressed in the region "bcd" (region "R3") with a high rotational speed and torque, these demands can be mitigated. Accordingly, it is preferable that the above-described regenerative electrical power suppression control is applied in the region "bcd" (region "R3") in FIG. 8.

Other Embodiments

Hereinafter, other embodiments will be described. Note that the configurations of the embodiments described below are not limited to being applied on their own, and they can be applied in combination with the configurations of other embodiments as long as no contradiction arises.

(1) In the mode described above, after the contactor 9 has entered the open state, active short control, partial shutdown control, and full shutdown control are executed in a time series. However, a configuration is possible in which active short control is not performed, and partial shutdown control and full shutdown control are executed in a time series after the contactor 9 has entered the open state. Specifically, in the case where the contactor 9 has entered the open state, partial shutdown control may be started in the target arm, and then full shutdown control may be started when the currents in the arms of the two phases other than the target arm both become zero.

Figure 9:
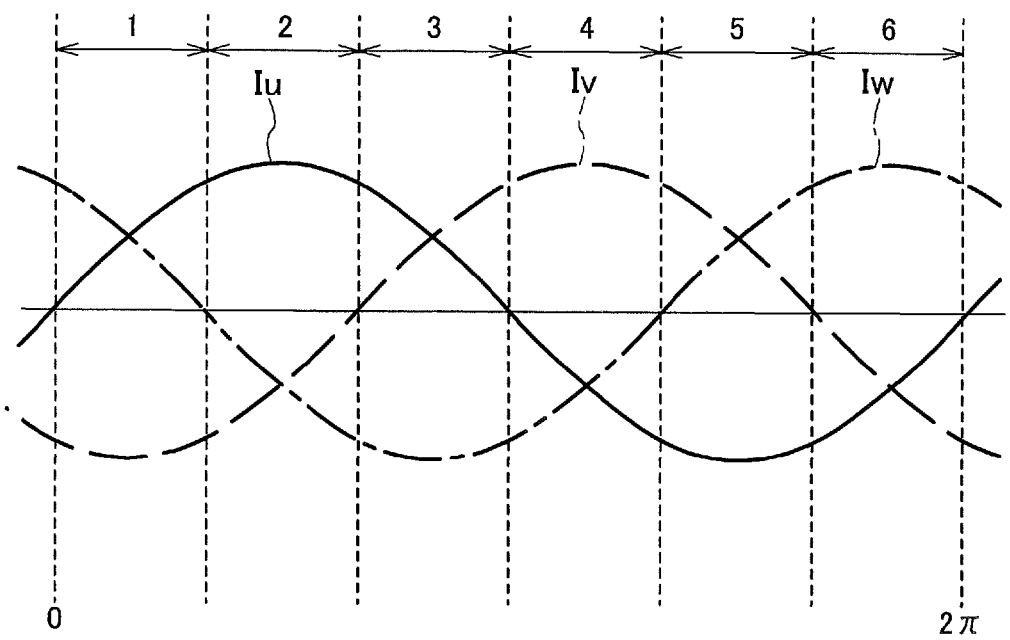
FIG. 9 is a current waveform diagram in the case where the rotating electric machine undergoes positive rotation.

At this time, it is preferable that the target arm is selected according to the current phases of the arms of the three phases, and then partial shutdown control is executed. For example, in the case where the current waveforms of two phases out of the three phases are on the positive side of the amplitude center, out of these two phases, the arm in which the current waveform is heading toward the amplitude center is selected as the target arm. Also, in the case where the current waveforms of two phases out of the three phases are on the negative side of the amplitude center, out of these two phases, the arm in which the current waveform is heading toward the amplitude center is selected as the target arm. FIG. 9 shows current waveforms when the rotating electric machine 80 undergoes positive rotation. The numbers given to the arrows in this figure indicate six states (Sectors) corresponding to the waveforms of the currents with the three phases (Iu, Iv, Iw), similarly to Table 1. For example, in Sector 1, two current waveforms, namely the U phase current Iu and the W phase current Iw, are on the positive side of the amplitude center. Within Sector 1, the U phase current Iu heads toward the current value peak, and the W phase current Iw heads toward the amplitude center. Accordingly, in Sector 1, the W phase arm is the target arm.

In partial shutdown control, the IGBTs 3 that are in the on state in the target arm are switched to the off state. In other words, all of the IGBTs 3 in the target arm (the upper side IGBT and the lower side IGBT) are switched to the off state. In above-described Sector 1, the W phase upper side IGBT 35 in the on state is switched to the off state. Since the W phase lower side IGBT 36 is in the off state in Sector 1, by switching the W phase upper side IGBT 35 to the off state, all of the IGBT 3s in the W phase arm will be in the off state.

Here, it is preferable that in Sector 1, out of the two phases in which the current waveform is on the positive side of the amplitude center, the on/off states of the IGBTs 3 in the U phase arm that is different from the target arm are switched. Specifically, in Sector 1, the U phase upper side IGBT 31 is in the on state, and the U phase lower side IGBT 32 is in the off state. When the W phase upper side IGBT 35 as the target arm is switched to the off state, the U phase upper side IGBT 31 is switched to the off state, and the U phase lower side IGBT 32 is switched to the on state. As shown in FIG. 9, in Sector 1, the V phase current Iv is on the negative side of the amplitude center, and the V phase lower side IGBT 34 is in the on state. Accordingly, when the U phase lower side IGBT 32 enters the on state, current reflux occurs on a path that includes the U phase lower side IGBT 32 and FWD 52, the U phase stator coil 8u, the V phase stator coil 8v, the V phase lower side IGBT 34, and the U phase lower side IGBT 32 and FWD 52, In other words, a partial active short circuit is formed. As described above, although partial shutdown control is executed, from a different viewpoint it can also be said that partial active short control is performed.

Alternatively, as described above with reference to FIG. 7, in this state, two phases out of the three phases are in the on state, and therefore this can be called two phase switching control. For example, in Sector 6, the waveforms of two currents, namely the U phase current Iu and the V phase current Iv, are on the negative side of the amplitude center, Within Sector 6, the V phase current Iv heads toward the negative peak of the current value, and the U phase current Iu heads toward the amplitude center. Accordingly, in Sector 6, the U phase arm is the target arm. In Sector 6, the U phase lower side IGBT 32, the V phase lower side IGBT 34, and the W phase upper side IGBT 35 are in the on state. Accordingly, the U phase lower side IGBT 32 is switched to the off state, and the on/off states of the upper side and limit IGBTs (33, 34) in the V phase arm are switched such that the V phase lower side IGBT 34 is switched to the off state, and the V phase upper side IGBT 33 is switched to the on state. The on/off states of the U phase upper side IGBT 31 and the W phase upper side and lower side IGBTs (35, 36) are maintained.

According to this control, in Sector 6, current reflux occurs in a path that includes the V phase upper side IGBT 33 and FWD 53, the W phase upper side IGBT 35, the W phase stator coil 8w, the V phase stator coil 8v, and the V phase upper side IGBT 33 and FWD 53. In other words, a partial active short circuit is formed. Specifically, similarly to the aspect described above with reference to FIG. 7, partial shutdown control, partial active short control, or two phase switching control is executed.

In this way, if the IGBTs 3 in the arms other than the target arm are controlled such that an active short circuit is formed, partial shutdown control can be executed in a state the same as the case where active short control has been performed. More generally, in the case where the current waveforms of two phases out of the three phases are on the positive side of the amplitude center, the inverter control device 20 selects the arm of, out of the two phases, the phase in which the current waveform is heading toward the amplitude center as the target arm, switches the IGBTs 3 in the on state in the target arm to the off state, and furthermore switches the upper side IGBT 3 in the arm of a phase different from the target arm out of the two phases to the off state, and switches the lower side IGBT 3 of the same arm to the on state, to execute partial shutdown control. Also, in the case where the current waveforms of two phases out of the three phases are on the negative side of the amplitude center, the inverter control device 20 selects the arm for, out of the two phases, the phase in which the current waveform is heading toward the amplitude center as the target arm, switches the IGBTs 3 in the on state in the target arm to the off state, and furthermore switches the lower side IGBT 3 in the arm of a phase different from the target arm out of the two phases to the off state, and switches the upper side IGBT 3 of the same arm to the on state, to execute partial shutdown control. Table 2 below shows the current waveforms for the three phases and the on/off states of the switching elements in the case of executing partial shutdown control in a state the same as the case where active short control has been performed.

Table 2: current waveforms for three phases and on/off states of switching elements during PSD control (case of executing PSD control at same time as ASC control)

TABLE 2

| Sector | Iu | Iv | Iw | Su+ | Sv+ | Sw+ | Su− | Sv− | Sw− |
|---|---|---|---|---|---|---|---|---|---|
| 1 | + | − | + | 0 | 0 | 0 | 1 | 1 | 0 |
| 2 | + | − | − | 1 | 0 | 1 | 0 | 0 | 0 |
| 3 | + | + | − | 0 | 0 | 0 | 0 | 1 | 1 |
| 4 | − | + | − | 1 | 1 | 0 | 0 | 0 | 0 |
| 5 | − | + | + | 0 | 0 | 0 | 1 | 0 | 1 |
| 6 | − | − | + | 0 | 1 | 1 | 0 | 0 | 0 |

Although the above description focuses on a mode in which partial active short control and partial shutdown control are performed together, a configuration is possible in which, after the contactor 9 has entered the open state during normal control, neither active short control nor partial active short control are performed, and partial shutdown control and full shutdown control are performed in a time series. Table 3 below shows the current waveforms for the three phases and the on/off states of the switching elements in the case of executing partial shutdown control after normal control. Based on a comparison of Table 2 and Table 3, it is understood that partial shutdown control is executed without being accompanied by partial active short control.

Table 3: current waveforms for three phases and on/off states of switching elements during PSD control (case of executing only PSD control after normal control)

TABLE 3

| Sector | Iu | Iv | Iw | Su+ | Sv+ | Sw+ | Su− | Sv− | Sw− |
|---|---|---|---|---|---|---|---|---|---|
| 1 | + | − | + | 1 | 0 | 0 | 0 | 1 | 0 |
| 2 | + | − | − | 1 | 0 | 0 | 0 | 0 | 1 |
| 3 | + | + | − | 0 | 1 | 0 | 0 | 0 | 1 |
| 4 | − | + | − | 0 | 1 | 0 | 1 | 0 | 0 |
| 5 | − | + | + | 0 | 0 | 1 | 1 | 0 | 0 |
| 6 | − | − | + | 0 | 0 | 1 | 0 | 1 | 0 |

(2) In the case where after the contactor 9 has entered the open state, partial shutdown control and full shutdown control are executed in a time series without active short control being performed, it is preferable that partial shutdown control is started when the current in the target arm, which is the arm for any one of the phases, becomes zero. As described above, if the current in the target arm is zero when partial shutdown control is started, the flow of current is not hindered by a shutdown, and the case of leading to a rise in the DC link voltage Vdc is suppressed.

(3) As described above, when the contactor 9 enters the open state, the DC link voltage Vdc rises immediately. Accordingly, it is preferable that the inverter control device 20 swiftly determines that the contactor 9 entered the open state and starts regenerative electrical power suppression control. Accordingly, in the example described above, it can be swiftly determined that the contactor 9 entered the open state based on a result of detection of the DC link voltage Vdc, without acquiring the state of the contactor 9 via the vehicle ECU 90 using a CAN or the like that generally requires time for communication. Also, another configuration is possible in which the opening of the contactor is determined based on a rapid change in the current of the high-voltage battery 11 (battery current), which is detected by the battery current sensor 15 provided between the high-voltage battery 11 and the DC link capacitor 4. When the contactor 9 enters the open state, a rapid change occurs in the state of the electrical connection between the high-voltage battery 11 and the circuits downstream thereof (DC link capacitor 4, inverter 10, rotating electric machine 80, etc.). For this reason, the current entering/exiting the high-voltage battery 11 also changes rapidly. Accordingly, in this case as well, the fact that the contactor 9 entered the open state can be detected by the inverter control device 20 more swiftly based on the result of detecting the current of the high-voltage battery 11 than by acquiring the state of the contactor 9 via the vehicle ECU 90 using a CAN or the like. In this way, swiftly detecting the opening of the contactor is particularly important in order to prevent the voltage (DC link voltage Vdc) across the terminals of the smoothing capacitor (DC link capacitor 4) from rising in a short time due to the opening of the contactor.

Overview Of Embodiments

The following is a brief description of an overview of the inverter control device (20) according to the embodiments described above.

As a preferable aspect, an inverter control device (20) is an inverter control device (20) for controlling a rotating electric machine drive device (1) that includes an inverter (10) and a DC link capacitor (4), the inverter (10) being connected to a DC power supply via a contactor (9), being connected to an alternating current rotating electric machine (80), and performing power conversion between direct current and three-phase alternating current, an arm for each alternating current phase being formed by a series circuit including an upper side switching element and a lower side switching element, and the DC link capacitor (4) smoothing a DC link voltage (Vdc), which is a DC-side voltage of the inverter (10), and the inverter control device (20) performing switching control on the switching elements (3) that form the inverter (10), wherein in a case where the contactor (9) entered an open state during rotation of the rotating electric machine (80), partial shutdown control is executed in which a switching element (3) in an on state in a target arm that is an arm of any one phase is switched to an off state, and thereafter full shutdown control is executed in which, when currents in the arms of two phases different from the target arm both become zero, switching elements (3) in the on state in all remaining arms are switched to the off state.

According to this configuration, in partial shutdown control, only one phase is shut down, thus limiting the flow of current that is hindered by shutdown, and reducing a rise in the DC link voltage (Vdc). When there is a transition from partial shutdown control to full shutdown control, the current in the arms that are to be shut down is zero, and therefore the rise in the DC link voltage (Vdc) caused by the shutdown is reduced. Note that up to the time when partial shutdown control is started, normal control may be performed without performing special control, or active short control may be executed, for example. For example, in the case where active short control is executed, a rise in the DC link voltage (Vdc) is substantially limited from when the contactor (9) has entered the open state until when active short control is started, and it is possible to greatly suppress a rise in the DC link voltage (Vdc). In this way, according to this configuration, in the case where the contactor (9) that connects the inverter (10) and the DC power supply has entered the open state, it is possible to suppress a rise in the DC link voltage (Vdc) of the inverter (10) and suppress the total amount of reflux current, while also setting the current flowing in the rotating electric machine (80) to zero.

At this time, it is preferable that the target arm is selected according to current phases of the arms of the three phases, and then the partial shutdown control is executed. The relative relationship between the current phases of the arms of the three phases corresponds to the spatial vector (switching control state) of the inverter (10), and therefore an appropriate target arm can be selected according to the spatial vector (switching control state).

Here, it is preferable that in the inverter control device (20), in a case where current waveforms of two phases out of the three phases are on a positive side of an amplitude center, the arm of a phase in which the current waveform heads toward the amplitude center out of the two phases is selected as the target arm, and in a case where current waveforms of two phases out of the three phases are on a negative side of the amplitude center, the arm of a phase in which the current waveform heads toward the amplitude center out of the two phases is selected as the target arm. The closer the current in the arm that is to be shutdown is to zero, the less the flow of current is hindered by the shutdown, and the more the case of leading to a rise in the DC link voltage (Vdc) is suppressed. Since the current is zero at the amplitude center, it is preferable that the arm of the phase in which the current waveform heads toward the amplitude center is selected as the target arm.

Also, in the inverter control device (20), it is preferable that in a case where current waveforms of two phases out of the three phases are on a positive side of the amplitude center, in the arm of a phase different from the target arm out of the two phases, the upper side switching element (3) is switched to the off state, and the lower side switching element (3) is switched to the on state, and in a case where current waveforms of two phases out of the three phases are on a negative side of the amplitude center, in the arm of a phase different from the target arm out of the two phases, the lower side switching element (3) is switched to the off state, and the upper side switching element (3) is switched to the on state, to execute the partial shutdown control. According to this configuration, if the switching elements (3) in the arms other than the target arm are also controlled such that an active short circuit is formed, partial shutdown control can be executed in a state the same as the case where active short control has been performed. In other words, active short control and shutdown control are executed at appropriate timings in a time series, thus making it possible to suppress current generated by active short control, and suppress a rise in voltage caused by shutdown control.

As a preferable aspect, in the inverter control device (20), in a case where the contactor (9) entered the open state during rotation of the rotating electric machine (80), one active short control is executed out of upper side active short control in which the upper side switching elements (3) in the arms of all three phases are switched to the on state and lower side active short control in which the lower side switching elements (3) in the arms of all three phases are switched to the on state, and the partial shutdown control is executed after the active short control has started.

According to this configuration, active short control, partial shutdown control, and full shutdown control are executed in a time series after the contactor (9) has entered the open state. There is an issue in which large current reflux continues to occur in active short control, and the voltage across the terminals of the DC link capacitor (4) (DC link voltage (Vdc)) rises greatly in shutdown control. However, if active short control and shutdown control are executed at appropriate timings in a time series as in the above configuration, it is possible to suppress current generated by active short control, and suppress a rise in voltage caused by shutdown control.

As another aspect, it is preferable that in the inverter control device (20), when a current in the target arm becomes zero, the switching element (3) in the on state in at least the target arm is switched to the off state, to execute the partial shutdown control. According to this aspect, when partial shutdown control starts, the current in the target arm is zero, and therefore the flow of current is not hindered by shutdown, and the case of leading to a rise in the DC link voltage (Vdc) is suppressed. Similarly, at the time of transition from partial shutdown control to full shutdown control as well, the current in the arm that is to be shut down is zero, thus suppressing the case of leading to a rise in the DC link voltage (Vdc) due to shutdown.

For example, it is preferable that after the contactor (9) has entered the open state, active short control, partial shutdown control, and full shutdown control are executed in a time series, and when the current in the target arm reaches zero, partial shutdown control is executed. As described above, if the current is zero in the arm that is shut down at the time of transition to the partial shutdown control and at the time of transition to full shutdown control, the flow of current is not hindered by a shutdown, and the case of leading to a rise in the DC link voltage (Vdc) is suppressed. In other words, a rise in the DC link voltage (Vdc) is substantially limited from when the contactor (9) has entered the open state until when active short control is started, thus making it possible to greatly suppress a rise in the DC link voltage (Vdc) in particular.

In general, the inverter (10) includes free wheel diodes (5) respectively connected in parallel to the switching elements (3) such that a forward direction is a direction from a lower side to an upper side. In this case of having such a configuration, as one aspect, it is preferable that in the inverter control device (20), when a current flowing through a free wheel diode (5) in a conductive state in the forward direction becomes zero, the switching element (3) connected in parallel to said free wheel diode (5) is switched to the off state to execute the partial shutdown control. The direction of current is defined by the free wheel diodes (5), and therefore specification of the target arm becomes easy. Also, in the target arm, when the current flowing through the free wheel diode (5) becomes zero, the current flowing through the switching element (3) also becomes zero, and therefore the inverter control device (20) can perform control such that the switching elements (3) in the target arm are switched to the off state at an appropriate timing.

Also, as another aspect, it is preferable that in the inverter control device (20), the upper side active short control or the lower side active short control is selected according to current phases of the arms of the three phases, and then the active short control is executed. Partial shutdown control is executed after active short control, and it is necessary for the current in the target arm to be zero when partial shutdown control is to be executed. If the active short control execution time is long, large current reflux occurs for that long period of time, and therefore it is preferable to be able to shorten the active short control execution time. The time from when active short control starts until when the current in the target arm becomes zero is dependent on the current phases of the three phases when active short control starts. It is also dependent on whether upper side active short control or lower side active short control is executed at that time. Accordingly, by selecting upper side active short control or lower side active short control according to the current phases in the arms of the three phases, it is possible to shorten the active short control execution time, and it is possible to shorten the time for which large current reflux occurs.

Here, as another aspect, it is preferable that in the inverter control device (20), when execution of the active short control is to be started, the lower side active short control is executed in a case where current waveforms of two phases out of the three phases are on a positive side of an amplitude center, and when execution of the active short control is to be started, the upper side active short control is executed in a case where current waveforms of two phases out of the three phases are on a negative side of the amplitude center. In the case where the current waveforms of two phases out of the three phases are on the positive side and the current waveform of one phase is on the negative side, there are two phases for which the lower side free wheel diodes (5) are conductive during the execution of lower side active short control. Also, in the case where the current waveforms of two phases out of the three phases are on the negative side and the current waveform of one phase is on the positive side, there are two phases for which the upper side free wheel diodes are conductive during the execution of upper side active short control. Accordingly, there are one or two switching elements (3) that can be switched to the off state when performing partial shutdown control, thus increasing the number of options in control, At the time of transitioning to partial shutdown control, if two switching elements (3) can be shifted from the on state to the off state, it is possible to suppress wearing down of the switching elements (3) caused by the flow of a large current, and reduce the influence on their lifetime.

In partial shutdown control, when the current in the target arm becomes zero, the switching elements (3) that are in the on state in at least the target arm are switched to the off state. However, the inverter (10) includes the free wheel diodes (5), and in the state where the current flows through a free wheel diode (5) in an arm, even if the switching element (3) connected in parallel to that free wheel diode (5) is in the off state, current flows in that arm. Accordingly, in partial shutdown control, as long as current continues to flow via the free wheel diodes (5), there is no problem if the switching elements (3) are in the off state in both the target arm and the arms other than the target arm. Since large current reflux occurs in active short control, if the switching elements (3) in which current flows are switched to the off state at an early time, it is possible to suppress a reduction in the lifetime of the switching elements (3). In other words, in the case where the inverter (10) includes free wheel diodes (5) respectively connected in parallel to the switching elements (3) such that a forward direction is a direction from a lower side to an upper side, it is preferable that in the inverter control device (20), the switching element (3) in the on state in the target arm is switched to the off state, and the switching element (3) connected in parallel to the free wheel diode (5) in a conductive state in the forward direction out of the switching elements (3) in the on state in the arms of two phases different from the target arm is switched to the off state, to execute the partial shutdown control.

INDUSTRIAL APPLICABILITY

The present disclosure is applicable to an inverter control device that controls driving of an alternating current rotating electric machine via an inverter.

The invention claimed is:

1. An inverter control device for controlling a rotating electric machine drive device that includes an inverter and a DC link capacitor, the inverter being connected to a DC power supply via a contactor, being connected to an alternating current rotating electric machine, and performing power conversion between direct current and three-phase alternating current, an arm for each alternating current phase being formed by a series circuit including an upper side switching element and a lower side switching element, and the DC link capacitor smoothing a DC link voltage, which is a DC-side voltage of the inverter, the inverter control device performing switching control on the switching elements that form the inverter, the inverter control device comprising:

an electronic control unit that includes control logic, which when executed:

executes partial shutdown control in which a switching element in an on state in a target arm that is an arm of any one phase is switched to an off state when the contactor enters an open state during rotation of the rotating electric machine, and thereafter executes full shutdown control in which, when currents in the arms of two phases different from the target arm both become zero, switching elements in the on state in all remaining arms are switched to the off state.

2. The inverter control device according to claim 1, wherein the target arm is selected according to current phases of the arms of the three phases, and then the partial shutdown control is executed.

3. The inverter control device according to claim 2, wherein in a case where current waveforms of two phases out of the three phases are on a positive side of an amplitude center, the arm of a phase in which the current waveform heads toward the amplitude center out of the two phases is selected as the target arm, and in a case where current waveforms of two phases out of the three phases are on a negative side of the amplitude center, the arm of a phase in which the current waveform heads toward the amplitude center out of the two phases is selected as the target arm.

4. The inverter control device according to claim 3, wherein in a case where current waveforms of two phases out of the three phases are on a positive side of the amplitude center, in the arm of a phase different from the target arm out of the two phases, the upper side switching element is switched to the off state, and the lower side switching element is switched to the on state, and in a case where current waveforms of two phases out of the three phases are on a negative side of the amplitude center, in the arm of a phase different from the target arm out of the two phases, the lower side switching element is switched to the off state, and the upper side switching element is switched to the on state, to execute the partial shutdown control.

5. The inverter control device according to claim 3, wherein in a case where the contactor entered the open state during rotation of the rotating electric machine, one active short control is executed out of upper side active short control in which the upper side switching elements in the arms of all three phases are switched to the on state and lower side active short control in which the lower side switching elements in the arms of all three phases are switched to the on state, and the partial shutdown control is executed after the active short control has started.

6. The inverter control device according to claim 5, wherein the upper side active short control or the lower side active short control is selected according to current phases of the arms of the three phases, and then the active short control is executed.

7. The inverter control device according to claim 6, wherein when execution of the active short control is to be started, the lower side active short control is executed in a case where current waveforms of two phases out of the three phases are on a positive side of an amplitude center, and when execution of the active short control is to be started, the upper side active short control is executed in a case where current waveforms of two phases out of the three phases are on a negative side of the amplitude center.

8. The inverter control device according to claim 3, wherein when a current in the target arm becomes zero, control is performed such that the switching element in the on state in at least the target arm is switched to the off state to execute the partial shutdown control.

9. The inverter control device according to claim 2, wherein in a case where the contactor entered the open state during rotation of the rotating electric machine, one active short control is executed out of upper side active short control in which the upper side switching elements in the arms of all three phases are switched to the on state and lower side active short control in which the lower side switching elements in the arms of all three phases are switched to the on state, and the partial shutdown control is executed after the active short control has started.

10. The inverter control device according to claim 9, wherein the upper side active short control or the lower side active short control is selected according to current phases of the arms of the three phases, and then the active short control is executed.

11. The inverter control device according to claim 10, wherein when execution of the active short control is to be started, the lower side active short control is executed in a case where current waveforms of two phases out of the three phases are on a positive side of an amplitude center, and when execution of the active short control is to be started, the upper side active short control is executed in a case where current waveforms of two phases out of the three phases are on a negative side of the amplitude center.

12. The inverter control device according to claim 9, wherein the inverter includes free wheel diodes respectively connected in parallel to the switching elements such that a forward direction is a direction from a lower side to an upper side, and control is performed such that the switching element in the on state in the target arm is switched to the off state, and the switching element connected in parallel to a free wheel diode in a conductive state in the forward direction out of the switching elements in the on state in the arms of two phases different from the target arm is switched to the off state, to execute the partial shutdown control.

13. The inverter control device according to claim 2, wherein when a current in the target arm becomes zero, control is performed such that the switching element in the on state in at least the target arm is switched to the off state to execute the partial shutdown control.

14. The inverter control device according to claim 13,
wherein the inverter includes free wheel diodes respectively connected in parallel to the switching elements such that a forward direction is a direction from a lower side to an upper side, and when a current flowing through a free wheel diode in a conductive state in the forward direction becomes zero, the switching element connected in parallel to said free wheel diode is switched to the off state to execute the partial shutdown control.

15. The inverter control device according to claim 1,
wherein in a case where the contactor entered the open state during rotation of the rotating electric machine, one active short control is executed out of upper side active short control in which the upper side switching elements in the arms of all three phases are switched to the on state and lower side active short control in which the lower side switching elements in the arms of all three phases are switched to the on state, and the partial shutdown control is executed after the active short control has started.

16. The inverter control device according to claim 15, wherein the upper side active short control or the lower side active short control is selected according to current phases of the arms of the three phases, and then the active short control is executed.

17. The inverter control device according to claim 16,
wherein when execution of the active short control is to be started, the lower side active short control is executed in a case where current waveforms of two phases out of the three phases are on a positive side of an amplitude center, and when execution of the active short control is to be started, the upper side active short control is executed in a case where current waveforms of two phases out of the three phases are on a negative side of the amplitude center.

18. The inverter control device according to claim 15,
wherein the inverter includes free wheel diodes respectively connected in parallel to the switching elements such that a forward direction is a direction from a lower side to an upper side, and control is performed such that the switching element in the on state in the target arm is switched to the off state, and the switching element connected in parallel to a free wheel diode in a conductive state in the forward direction out of the switching elements in the on state in the arms of two phases different from the target arm is switched to the off state, to execute the partial shutdown control.

19. The inverter control device according to claim 1, wherein when a current in the target arm becomes zero, control is performed such that the switching element in the on state in at least the target arm is switched to the off state to execute the partial shutdown control.

20. The inverter control device according to claim 19,
wherein the inverter includes free wheel diodes respectively connected in parallel to the switching elements such that a forward direction is a direction from a lower side to an upper side, and when a current flowing through a free wheel diode in a conductive state in the forward direction becomes zero, the switching element connected in parallel to said free wheel diode is switched to the off state to execute the partial shutdown control.

* * * * *